US009277460B2

(12) United States Patent
Diachina et al.

(10) Patent No.: US 9,277,460 B2
(45) Date of Patent: *Mar. 1, 2016

(54) SYSTEM AND METHOD FOR PROVIDING VOICE SERVICE IN A MULTIMEDIA MOBILE NETWORK

(75) Inventors: John Diachina, Garner, NC (US); Hans Krister Mikael Sällberg, Lund (SE); Lars Håkan Palm, Växjo (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 153 days.

This patent is subject to a terminal disclaimer.

(21) Appl. No.: 13/526,044

(22) Filed: Jun. 18, 2012

(65) Prior Publication Data

US 2012/0257600 A1    Oct. 11, 2012

Related U.S. Application Data

(63) Continuation of application No. 12/137,393, filed on Jun. 11, 2008, now Pat. No. 8,259,673.

(60) Provisional application No. 60/945,000, filed on Jun. 19, 2007.

(51) Int. Cl.
*H04W 4/00* (2009.01)
*H04W 36/00* (2009.01)
(Continued)

(52) U.S. Cl.
CPC .......... *H04W 36/0022* (2013.01); *H04W 36/26* (2013.01); *H04W 88/06* (2013.01)

(58) Field of Classification Search
CPC .................................................. H04W 36/18
USPC ................................. 370/332, 331, 330, 329
See application file for complete search history.

(56) References Cited

U.S. PATENT DOCUMENTS 6,424,833 B1 * 7/2002 Iizuka .................. H04W 36/30
370/328
7,639,989 B2 * 12/2009 Terry .................... H04L 1/0009
370/332
(Continued)

FOREIGN PATENT DOCUMENTS

EP    1 343 082 A2    9/2003
EP    1 753 260 A1    2/2007
WO   WO 2007/007990 A1    1/2007

OTHER PUBLICATIONS

Digital cellular telecommunications system (Phase 2+); Universal Mobile Telecommunications System (UMTS); Voice call continuity between Circuit Switched (CS) and IP Multimedia Subsystem (IMS); Stage 3. (3GPP TS 24.206 v7.1.0 Release 7) ETSI TS 124 206 v7.1.0 (Mar. 2007).

*Primary Examiner* — Hassan Kizou
*Assistant Examiner* — Abdelnabi Musa

(57) ABSTRACT

User Equipment (UE) receiving non-voice packet switched service in an Evolved Universal Mobile Telecommunications System Terrestial Radio Access Network (eUTRAN) cell undergoes handover to a circuit switched GSM/Edge Radio Access Network (GERAN)/UTRAN cell in response to a requirement for voice service. The voice service is established in the circuit switched domain of a GERAN/UTRAN cell to ensure service continuity regardless of UE mobility that would otherwise not be possible if the voice service was established in the eUTRAN cell. A Gs-like interface between a Mobile Switching Center (MSC) of the CS Core Network and the Mobility Management Entity (MME) of the Evolved Packet Core provides an interface for page requests and location update procedures to be performed.

20 Claims, 3 Drawing Sheets

(51) Int. Cl.
*H04W 36/26* (2009.01)
*H04W 88/06* (2009.01)

(56) References Cited

U.S. PATENT DOCUMENTS

| | | | |
|---|---|---|---|
| 7,907,952 B2 * | 3/2011 | Lee | H04W 72/005 370/332 |
| 2004/0068644 A1 | 4/2004 | Hutton et al. | |
| 2005/0245263 A1 | 11/2005 | Ejzak | |
| 2006/0109819 A1 * | 5/2006 | Marin et al. | 370/331 |
| 2006/0281459 A1 * | 12/2006 | Marinescu et al. | 455/436 |
| 2007/0019575 A1 * | 1/2007 | Shaheen | 370/310 |
| 2007/0021120 A1 * | 1/2007 | Flore et al. | 455/436 |
| 2008/0080428 A1 * | 4/2008 | Jappila et al. | 370/331 |
| 2011/0110326 A1 * | 5/2011 | Rexhepi et al. | 370/331 |

* cited by examiner

SYSTEM AND METHOD FOR PROVIDING VOICE SERVICE IN A MULTIMEDIA MOBILE NETWORK

CROSS-REFERENCE TO RELATED APPLICATIONS

This application is a continuation of U.S. application Ser. No. 12/137,393, filed Jun. 11, 2008 now U.S. Pat. No. 8,259, 673, which claims the benefit of U.S. Provisional Application No. 60/945,000 filed Jun. 19, 2007, the disclosures of which are incorporated herein by reference. This application is also related to U.S. Pat. No. 8,094,620, filed on Jun. 11, 2008, and U.S. patent application Ser. No. 13/287,506, filed on Nov. 2, 2011.

FIELD OF THE INVENTION

The present invention relates to multimedia networks. More particularly, and not by way of limitation, the present invention is directed to a system and method for providing voice service in a multimedia mobile network.

BACKGROUND OF THE INVENTION

UMTS (Universal Mobile Telecommunications System) Terrestial Radio Access Network (UTRAN) is a 3G technology for wireless provision of multimedia services. The deployment of Evolved UTRAN (eUTRAN), also known a Long Term Evolution (LTE) and Evolved Packet Core (EPC), requires telephony services to be migrated from a traditional circuit switched (CS) system to a packet switched (PS) system, e.g. provided by Multimedia Telephony Service for IMS (MTSI). This requires the Internet Protocol (IP) Multimedia Subsystem (IMS) to be widely deployed earlier than eUTRAN and EPC.

It would be advantageous to provide an architecture which allows the reuse of deployed CS core network infrastructure for supporting voice service when introducing eUTRAN and EPC.

BRIEF SUMMARY OF THE INVENTION

In one aspect, the present invention is directed to a mobility management entity configured to identify a voice service requirement for a User Equipment, recognize support for a Gs-like interface, and handover the User Equipment to a circuit switched cell in response to the voice service requirement and in response to the recognition of support for said Gs-like interface.

In another aspect, the present invention is directed to a mobile telecommunications device configured to receive a handover from a packet switched cell to a circuit switched cell and perform circuit switched call establishment procedures with the circuit switched cell at the completion of a handover procedure.

In yet another aspect, the present invention is directed to an eNodeB configured to accept a handover command in respect of a user equipment, obtain a measurement report for the user equipment and handover the user equipment to a circuit switched cell indicated in the measurement report, wherein the handover command is accepted in response to a request for voice service with the user equipment.

In yet another aspect, the present invention is directed to method for user equipment to establish a voice service. The method comprises receiving a handover command for handover from a packet switched cell to a circuit switched cell and performing circuit switched call establishment procedures with the circuit switched cell at the completion of a handover procedure.

In yet another aspect, the present invention is directed to a method for providing voice service to User Equipment (UE) operating in a packet switched domain of an Evolved Universal Mobile Telecommunications System Terrestrial Radio Access Network (eUTRAN) cell. The method comprises generating a voice service requirement, determining a circuit switched cell, and establishing voice service between said UE and said circuit switched cell in a circuit switched domain based on the generating and the determining.

In yet another aspect, the present invention is directed to a network comprising a plurality of circuit switched cells and an Evolved Packet System (EPS). The EPS comprises a plurality of Evolved UTRAN cells (eUTRAN) and at least one Evolved Packet Core (EPC). The EPC is configured to handover a User Equipment (UE) operating in at least one of the eUTRAN cells to at least one of the circuit switched cells in response to a voice service requirement.

In yet another aspect, the present invention is directed to a method for an Evolved Packet Core to establish a voice service comprising identifying a voice service requirement and performing a handover from a packet switched cell to a circuit switched cell.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Figure 1:
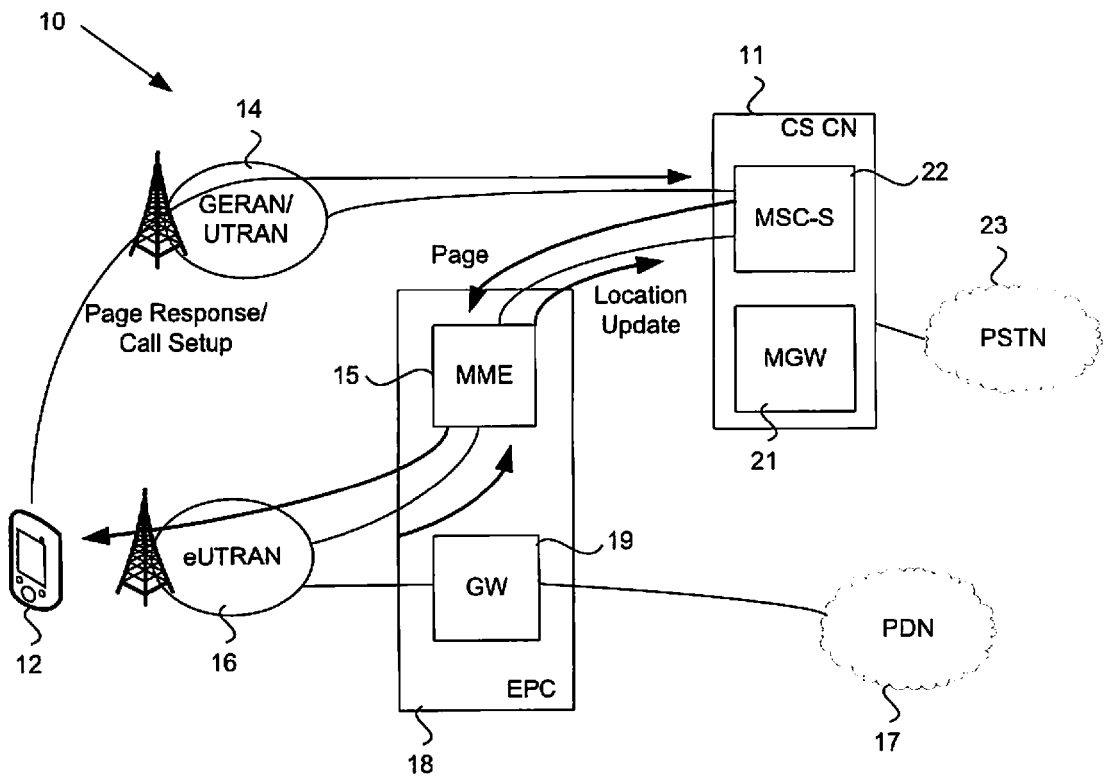
FIG. 1 is a schematic representation of a network utilized in an embodiment of the present invention.

A network 10 is shown generally in FIG. 1. A CS Core Network (CN) 11 includes a Media Gateway (MGW) 21 and a Mobile Switching Center (MSC) 22. Other aspects of the CS domain are also assumed to be present, such as the Home Location Register (HLR), etc. but are omitted for clarity. The CS Core Network 11 provides voice service from a Public Switched Telephone Network (PSTN) 23 to user equipment (UE) 12 through 2G/3G Radio Access Network (RAN) cells, e.g. GERAN (GSM/Edge Radio Access Network) or UTRAN 14. The network 10 also includes an Evolved Packet System (EPS) comprising an eUTRAN 16 providing PS services, including voice, via one or more eUTRAN cells. PS services are provided from a Packet Data Network 17 via an Evolved Packet Core (EPC) network 18 including a serving gateway 19 and a Mobility Management Entity (MME) 15. The MME 15 provides control aspects including idle mode UE location tracking as well as paging procedures in accordance with eUTRAN standards.

In the network 10 of FIG. 1, voice service may be provided to the UE 12 in the PS domain via the eUTRAN cells or in the CS domain via the GERAN/UTRAN cells since the coverage areas provided by these cells is expected to involve a very significant degree of overlap. In the present example, it is considered that the UE 12, also referred to as a mobile station (MS) is operating in an eUTRAN cell controlled by eUTRAN 16 (also known as an LTE cell) with one or more active packet services that do not include a voice component, i.e. there is no ongoing voice service in the eUTRAN cell. When a voice service is needed it could be established in the PS domain as a VoIP service within the current eUTRAN cell. However, if the roll out of eUTRAN service is phased in that IMS service is not present at initial LTE deployment, there may be eUTRAN coverage areas that are overlapped by GERAN/UTRAN coverage areas. In these overlapped areas, continuity of voice service initiated within eUTRAN cells may not be possible when the UE 12 approaches the edge of eUTRAN coverage due to the lack of the domain transfer function (DTF) associated with IMS service deployment. As such, to allow voice calls to be established in an eUTRAN cell when IMS is not supported would result in those calls being dropped if the UE were to leave the LTE coverage area. If instead, at the point when voice service is desired the UE 12 is made to leave the eUTRAN cell even though eUTRAN coverage is still available and take advantage of the overlaid coverage area of a 2G (GERAN) or 3G (UTRAN) cell, then the voice service can be established in the CS domain using a 2G/3G cell without concern for it being prematurely dropped as could happen if it was established in the eUTRAN cell, since 2G/3G cell coverage is considered to be ubiquitous. Thus, in one embodiment, the requirement to establish a voice service while the UE 12 is within LTE coverage triggers a handover of the UE 12 from the eUTRAN cell to a GERAN/UTRAN cell where the desired voice service is established in the CS domain.

Figure 2:
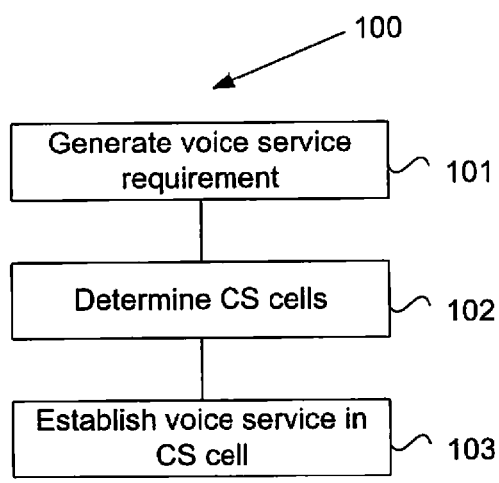
FIG. 2 is a flowchart of a method for providing packet switched handover from an eUTRAN cell.

A method for providing voice service to a UE operating in a packet switched domain of an eUTRAN cell will now be described with reference to FIG. 1 and to the flowchart 100 of FIG. 2. At step 101, a requirement for establishing voice service is identified. A CS cell that is able to support the voice service is then determined (step 102). In one embodiment, the voice service requirement may be a mobile terminated (MT) voice call which results in the MSC sending a voice call page to the MME. The MME forwards the page to the eNodeB which may then directly send the UE a control plane message indicating an MT CS domain voice service is needed. In this case the page the MME sends to the eNodeB indicates voice call establishment in the CS domain is required. Alternatively, the eNodeB may indirectly send the UE this control plane message (i.e. after first sending the UE a page without an indication that MT CS domain voice service needs to be established, receiving a page response from the UE, forwarding the page response to the MME and then receiving a signaling message from the MME indicating that handover to a GERAN/UTRAN cell should be performed for the purpose of MT voice service establishment in the CS domain. The reception of such a control plane message by a UE 12 operating in an eUTRAN cell causes the UE 12 to generate a measurement report indicating a specific GERAN/UTRAN cell to which PS handover is preferred. The measurement report may also indicate multiple GERAN/UTRAN cells to which handover is acceptable along with an indication of the most preferred GERAN/UTRAN cell, the second most preferred GERAN/UTRAN cell etc.

In one embodiment, the voice service requirement may be a mobile originated (MO) voice call in which case the eNodeB directly receives a request for the establishment of an MO voice service in the CS domain as a result of the UE autonomously sending it a measurement report indicating handover to a GERAN/UTRAN cell is desired. Alternatively, the eNodeB may indirectly receive a request for the establishment of an MO voice service in the CS domain when the UE sends a voice service request to the MME which then responds by sending the eNodeB a signaling message indicating that handover to a GERAN/UTRAN cell should be performed for the purpose of MO voice service establishment in the CS domain. In this indirect case once the eNodeB receives a request for the establishment of an MO voice service in the CS domain it sends a signaling message to the UE requesting it to send a measurement report including only GERAN/UTRAN cells. For both the direct and indirect cases a measurement report is sent by the UE indicating a specific GERAN/UTRAN cell to which handover is preferred or multiple GERAN/UTRAN cells to which handover is acceptable along with an indication of the most preferred GERAN/UTRAN cell, the second most preferred GERAN/UTRAN cell etc. For the direct case system broadcast information is necessary to inform a UE that it can generate a CS domain voice service request by sending an unsolicited measurement report that only includes GERAN/UTRAN cells.

Once PS handover is triggered (i.e. the non-voice services ongoing in the LTE cell are assigned radio resources to use in the 2G/3G cell selected for handover), the UE 12 receives a PS handover command, leaves the eUTRAN cell, arrives in the target GERAN/UTRAN cell and sends a page response to the MSC (for the MT voice call) or otherwise signals the need for CS domain resources to be assigned (for the MO case). CS domain voice service is then established, at step 103, between the UE 12 and the GERAN/UTRAN 14 and the CS CN 11 as per legacy procedures for MT/MO call setup.

If the UE 12 and the GERAN/UTRAN 14 do not both support dual transfer mode, then once the voice service is established in the CS domain the PS resources are dropped. If the UE and the GERAN/UTRAN 14 both support dual transfer mode, then the PS resources are maintained in parallel with the resources required for the CS domain speech service. The case of PS handover to a UTRAN cell can be considered as the logical equivalent of PS handover to a GERAN cell where dual transfer mode is supported since UTRAN inherently allows for PS domain and CS domain services to operate in parallel.

In either case (dual transfer mode supported or not) there is no need for a subsequent intra-cell handover to be performed (i.e. to assign the CS domain resources required for the voice service) following the PS handover from the eUTRAN cell because the CS domain resources are assigned in the target GERAN/UTRAN cell as part of the legacy MT and MO voice service establishment procedures. If dual transfer mode is not supported then the PS resources assigned by the target GERAN cell as part of the eUTRAN to GERAN handover procedure are only kept until the CS service is established and then explicitly or implicitly released.

If the UE 12 and the GERAN/UTRAN 14 do not both support dual transfer mode or the set of active PS services in the eUTRAN cell are not delay sensitive to the point of strictly needing a PS handover for cell change, then the UE 12 or the eUTRAN 16 could still trigger a PS handover to a GERAN/UTRAN cell in order to minimize the delay in establishing the desired voice service in the CS domain.

Figure 3:
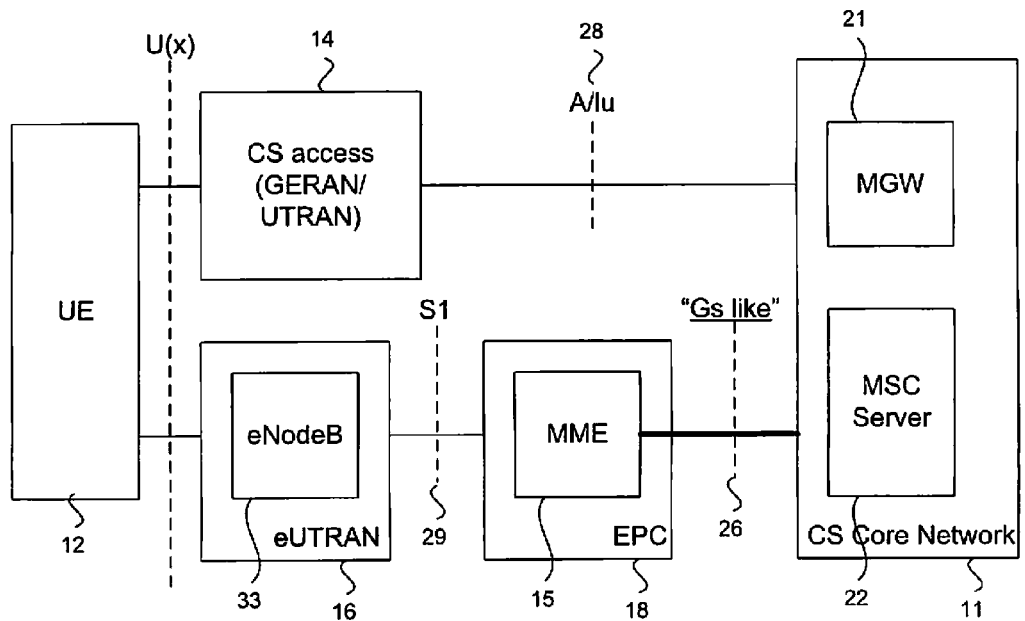
FIG. 3 shows the interfaces of the network of FIG. 1.

A block diagram showing the network interfaces is shown in FIG. 3. The user equipment 12 has circuit switched access through a GERAN/UTRAN 14 which communicates with the CS core network 11 through an A/Iu interface 28. The UE 12 also communicates with an eNodeB 33 of the eUTRAN 16. The eUTRAN 16 interfaces with the Evolved Packet Core (EPC) 18 through an S1 interface 29, as is known for 3GPP.

In a typical circuit switched Generic Packet Radio Services (GPRS) network, PS domain mobility management is performed by a Serving GPRS Support Node (SGSN) where a Gs interface is provided between the SGSN and the MSC to provide CS domain location update information to the MSC. In an EPS network, mobility management is performed by a mobility management entity (MME) 15 of the Evolved Packet Core (EPC) 18. Thus in order to maintain CS domain mobility management functions in the MSC server 22, a "Gs like" interface 26 is provided between the MME 15 of the EPC 18 and the MSC server 22 of the CS Core Network 11. The Gs-like interface 26 can be used for the CS domain Location Update procedure (normally triggered in a GERAN cell during the PS handover procedure) so that CS Paging messages can be sent from the MSC server 22 to the MME 15.

The presence of the Gs-like interface can be used as a trigger for the MME to determine when to perform the PS Handover to the CS core network for both the MT and MO voice service request scenarios. For the direct MO voice service request case the presence of the Gs-like interface causes the MME to send system broadcast information that informs a UE that it can generate a CS domain voice service request by sending an unsolicited measurement report that only includes GERAN/UTRAN cells. For the indirect MO voice service request case the MME will respond to a voice service request received from the UE (via the eNodeB) by ordering an Inter-RAT PS handover to a GERAN/UTRAN cell (i.e. instead of performing call establishment procedures in the packet switched domain). For the direct MT voice service request case, the MME can send the eNodeB a page indicating that an Inter-RAT PS handover to a GERAN/UTRAN cell should be performed (i.e. instead of performing call establishment procedures in the packet switched domain) in which case the eNodeB sends a signaling message to the UE that serves both as a page and as a request for measurement information. Upon receiving a response to this signaling message the eNodeB uses the provided measurement history to command the UE to perform an Inter-RAT PS handover to a GERAN/UTRAN cell. For the indirect MT voice service request case the MME triggers paging of the UE using generic paging procedures (i.e. it must verify that the UE is actually available in an eUTRAN cell) where the page it sends to the eNodeB does not indicate that an Inter-RAT PS handover to a GERAN/UTRAN cell should be performed. Upon receiving a service request from the UE (via the eNodeB) in response to the paging attempt and knowing that it supports a Gs-like interface to an MSC, the MME will again realize that an Inter-RAT PS handover to GERAN/UTRAN is necessary and can therefore respond to the service request by ordering the eNodeB to perform an Inter-RAT PS HO to a GERAN/UTRAN cell for that UE.

In another embodiment related to the direct case, the eNodeB will, upon getting a Page Response from the UE (i.e. confirming it is present in a specific E-UTRAN cell), have the authority to trigger the PS handover procedure and as a result send the UE a PS Handover Command. This is possible when the MME uses the Page it sends to the eNodeB to effectively convey its knowledge of the presence of the Gs like interface.

Within the 3GPP CS domain both Location Area (LA) and Service Area (SA) are fundamental concepts used for various purposes, for example to support CS service 'control' based on geographical areas. The Location Area and Service Area concepts may be inherently supported by the EPS and/or with a mapping between the LTE Tracking Area and the 2G/3G cell structures (i.e. LA and SA).

Figure 4:
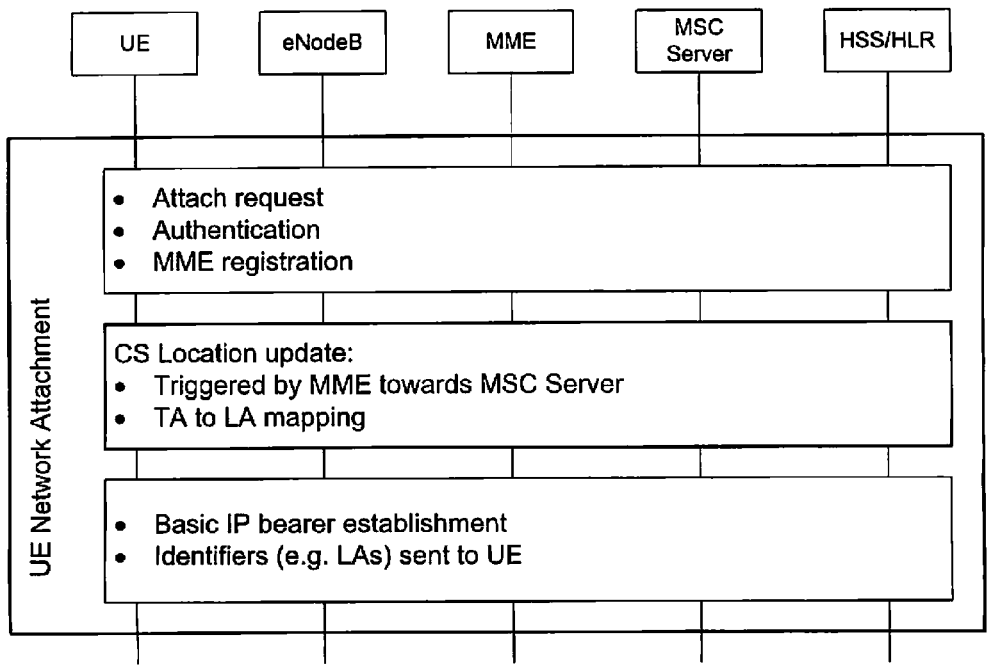
FIG. 4 shows a UE network attachment procedure.

As described above, EPS mobility management is provided through a mobility management entity (MME) 15. An example of mobility management is shown in FIG. 4 with the specific example of the network attachment of a UE. The UE is provided with identifiers needed to establish CS voice service. The UE sends an attach request to the eNodeB which results in the UE being authenticated prior to MME registration. While operating within LTE coverage (i.e. while there is no need to establish a voice service) CS Location updates may be triggered by the MME 15 towards the MSC Server 22 using an LTE tracking area (TA) to location area (LA) mapping. It should be noted that the CS attachment may be embedded and that the CS Location Update procedure can either be triggered by the UE (e.g. with LA structure visible in broadcast) or by the MME (based on mapping from the TA structure of LTE/SAE). Once the basic IP bearers are established, the identifiers (e.g. LAs) may be sent to the UE. The same concepts may be used when the UE is roaming to other LTE coverage areas. That is, the LTE TA update procedure may include the CS Location Update procedure.

Before initiating an originating CS voice service, the UE is moved to a 2G/3G cell using PS handover. After arriving in the 2G/3G cell all subsequent call establishment signaling is identical to a 2G/3G originating call and eUTRAN and EPC are not involved.

Figure 5:
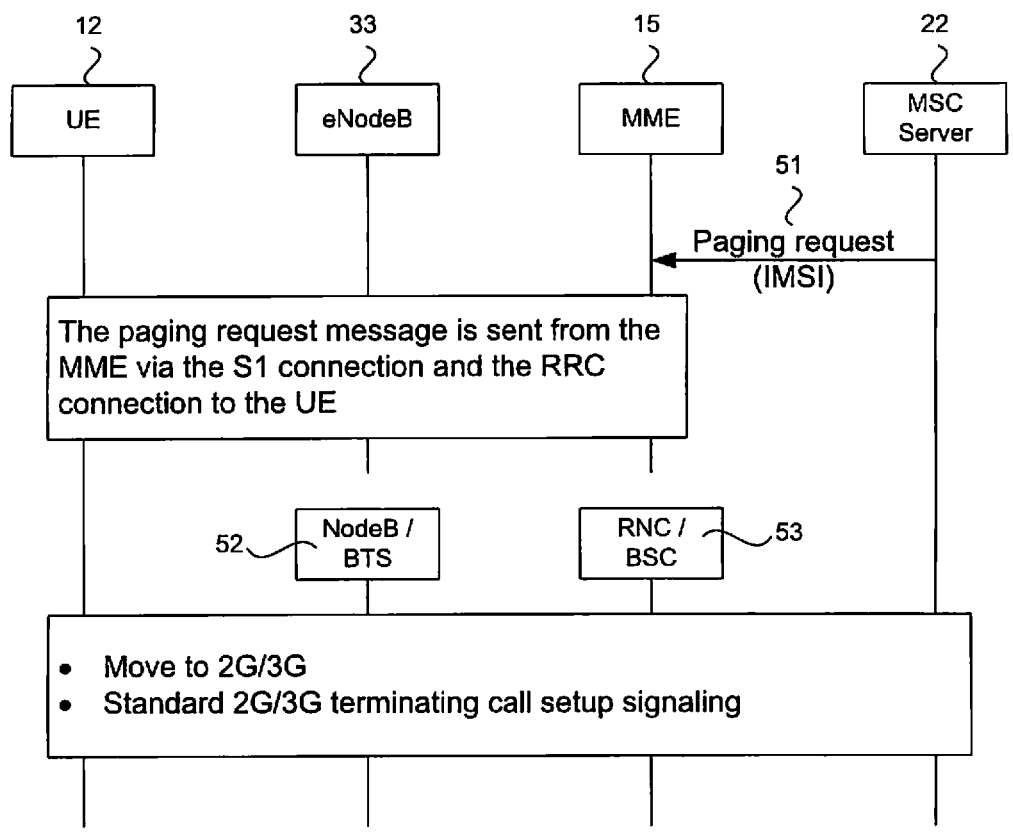
FIG. 5 shows a terminating voice call.

The terminating call handling when eUTRAN is active is depicted in FIG. 5. The paging request 51, including International Mobile Subscriber Identity (IMSI) originates in the MSC Server 22 and is sent to the MME 15. The MME 15 sends the paging request to the eNodeB 33 via the S1 interface and the Radio Resource Control (RRC) connection may then be used to extend the paging notification to the UE 12. The reception of the paging notification at the UE 12 may cause it to send measurement report information to the eNodeB 33 which then triggers the eNodeB to send the UE 12 a PS handover command using that measurement report information (i.e. the direct case of MT CS domain voice service establishment). The UE is moved to a 2G/3G cell (using PS handover) prior to the call establishment signaling. After arriving in the 2G/3G cell all subsequent call establishment signaling is identical to that used for legacy mode operation where a 2G/3G terminating call is triggered when a UE is being served by a 2G/3G cell, e.g. using NodeB 52 and Radio Network Controllers 53.

As will be apparent to a person skilled in the art, the presently described embodiments leverage on existing 2G/3G mechanisms. However, there is no impact on the 2G/3G RAN and the level of impact on the 2G/3G core network is minor with no new protocol being required.

The presently described embodiments may be understood as a cost efficient "gap filler" to provide CS voice services that offers the operator a bit more time to migrate to MTSI when deploying eUTRAN.

The terms and descriptors used herein follow standard terminology used in the 3GPP standards for Evolved Packet Systems and Long Term Evolution. Description of features, interfaces and performance not forming part of the innovative concepts are omitted for the sake of clarity.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method for user equipment to establish a voice service, the method comprising:
   sending a voice service request to establish a mobile originated (MO) voice service;
   receiving a signaling message, wherein the signaling message requests the user equipment to send a measurement report, wherein the user equipment is operating in an Evolved Universal Mobile Telecommunications System Radio Access Network (eUTRAN) with one or more packet services but with no ongoing voice service and circuit-switched (CS) location updates are triggered by the user equipment as needed based on a location area (LA) structure visible in broadcast, and the measurement report includes information indicating only circuit-switched capable cells;

sending the measurement report to the eUTRAN cell;

receiving a PS handover command for handover from the eUTRAN cell to a circuit switched capable cell; and performing circuit switched call establishment procedures after the user equipment has arrived in the circuit switched capable cell during a PS handover procedure.

2. The method according to claim 1 comprising performing the circuit switched call establishment procedures with the circuit switched capable cell immediately after the completion of a PS handover procedure.

3. The method according to claim 1 further comprising generating a voice service requirement, wherein the PS handover command is received in response to generating the voice service requirement.

4. The method according to claim 1, wherein the measurement report further comprises a specific circuit switched capable cell to which PS handover is preferred.

5. The method according to claim 1, wherein the measurement report further comprises multiple circuit switched cells to which PS handover is acceptable along with an indication of a most preferred circuit switched capable cell.

6. The method according to claim 1, further comprising receiving a signaling message from the eUTRAN cell requesting the measurement report including information indicating only circuit-switched capable cells.

7. The method according to claim 1, further comprising:
in response to determining that the user equipment and the circuit switched cell do not both support a dual transfer mode, dropping the one or more packet services once voice service is established in the circuit-switched capable cell.

8. The method according to claim 1, further comprising:
in response to determining that the user equipment and the circuit switched cell supports a dual transfer mode, the at least one packet services are maintained in parallel with the voice service established in the circuit-switched capable cell.

9. A method for user equipment to establish a voice service, the method comprising:
receiving a control plane message indicating a mobile terminated (MT) circuit switched (CS) domain voice service is needed;
in response to receiving the control plane message, sending a measurement report to the eUTRAN cell, wherein the measurement report indicates a PS handover to a circuit-switched capable cell is desired, wherein
the user equipment is operating in an Evolved Universal Mobile Telecommunications System Radio Access Network (eUTRAN) with one or more packet services but with no ongoing voice service, and
the measurement report includes information indicating only circuit-switched capable cells;
receiving a PS handover command for handover from the eUTRAN cell to a circuit switched capable cell; and
performing circuit switched call establishment procedures after the user equipment has arrived in the circuit switched capable cell during a PS handover procedure.

10. The method according to claim 9, wherein the measurement report further comprises a specific circuit switched capable cell to which PS handover is preferred.

11. The method according to claim 9, wherein the measurement report further comprises multiple circuit switched capable cells to which PS handover is acceptable along with an indication of a most preferred circuit switched capable cell.

12. A user equipment, comprising:
at least one microprocessor;
a non-transitory computer-readable storage medium, coupled to the at least one microprocessor, further including computer-readable instructions, when executed by the at least one microprocessor, are configured to:
send a voice service request to establish a mobile originated (MO) voice service,
receive a signaling message, wherein the signaling message requests the user equipment to send a measurement report, wherein
the user equipment is operating in an Evolved Universal Mobile Telecommunications System Radio Access Network (eUTRAN) with one or more packet services but with no ongoing voice service and circuit-switched (CS) location updates are triggered by the user equipment as needed based on a location area (LA) structure visible in broadcast, and
the measurement report includes information indicating only circuit-switched capable cells;
send the measurement report to the eUTRAN cell,
receive a PS handover command for handover from the eUTRAN cell to a circuit-switched capable cell,
perform circuit-switched capable call establishment procedures after the user equipment has arrived in the circuit-switched capable cell during a PS handover procedure.

13. The user equipment according to claim 12, wherein the computer-readable instructions are further configured to:
perform the circuit-switched capable call establishment procedures with the circuit-switched capable cell immediately after the completion of a PS handover procedure.

14. The user equipment according to claim 12, wherein the computer-readable instructions are further configured to:
generate a voice service requirement, wherein the PS handover command is received in response to generating the voice service requirement.

15. The user equipment according to claim 12, wherein the measurement report further comprises a specific circuit-switched capable cell to which PS handover is preferred.

16. The user equipment according to claim 12, wherein the measurement report further comprises multiple circuit switched capable cells to which PS handover is acceptable along with an indication of a most preferred circuit switched capable cell.

17. The user equipment according to claim 12, wherein the computer-readable instructions are further configured to:
receive a signaling message from the eUTRAN cell requesting a measurement report including information indicating only circuit-switched capable cells.

18. The user equipment according to claim 12, wherein the computer-readable instructions are further configured to:
in response to determining that the user equipment and the circuit-switched capable cell do not both support a dual transfer mode, dropping the one or more packet services once voice service is established in the circuit-switched capable cell.

19. The user equipment according to claim 12, wherein the computer-readable instructions are further configured to:

in response to determining that the user equipment and the circuit-switched capable cell supports a dual transfer mode, the at least one packet services are maintained in parallel with the voice service established in the circuit-switched capable cell.

20. A user equipment, comprising:

at least one microprocessor;

a non-transitory computer-readable storage medium, coupled to the at least one microprocessor, further including computer-readable instructions, when executed by the at least one microprocessor, are configured to:

receive a control plane message indicating a mobile terminated (MT) circuit switched (CS) domain voice service is needed, in response to receiving the control plane message, send a measurement report to the eUTRAN cell, wherein the measurement report indicates a PS handover to a circuit-switched capable cell is desired, wherein the user equipment is operating in an Evolved Universal Mobile Telecommunications System Radio Access Network (eUTRAN) cell with one or more packet services but with no ongoing voice service, and the measurement report includes information indicating only circuit-switched capable cells, receive a PS handover command for handover from the eUTRAN cell to a circuit switched capable cell, and perform circuit switched call establishment procedures after the user equipment has arrived in the circuit switched capable cell during a PS handover procedure.

* * * * *

UNITED STATES PATENT AND TRADEMARK OFFICE
CERTIFICATE OF CORRECTION

| | |
|---|---|
| PATENT NO. | : 9,277,460 B2 |
| APPLICATION NO. | : 13/526044 |
| DATED | : March 1, 2016 |
| INVENTOR(S) | : Diachina et al. |

It is certified that error appears in the above-identified patent and that said Letters Patent is hereby corrected as shown below:

On the Title Page, item (75), under "Inventors", in Column 1, Line 3, delete "Växjo" and insert -- Växjö --, therefor.

On the Title Page, item (57), under "ABSTRACT", in Column 2, Line 3, delete "Terrestial" and insert -- Terrestrial --, therefor.

In the specification,

In Column 1, Line 27, delete "Terrestial" and insert -- Terrestrial --, therefor.

In Column 2, Line 28, delete "DRAWING" and insert -- DRAWINGS --, therefor.

In Column 3, Line 46, delete "established," and insert -- established), --, therefor.

In the claims,

In Column 7, Line 2, in Claim 1, delete "System" and insert -- System Terrestrial --, therefor.

In Column 7, Line 58, in Claim 9, delete "System" and insert -- System Terrestrial --, therefor.

In Column 8, Line 22, in Claim 12, delete "System" and insert -- System Terrestrial --, therefor.

In Column 10, Line 6, in Claim 20, delete "System" and insert -- System Terrestrial --, therefor.

Signed and Sealed this
Second Day of August, 2016

Michelle K. Lee
*Director of the United States Patent and Trademark Office*